United States Patent [19]

Arnold

[11] 4,171,540

[45] Oct. 16, 1979

[54] APPARATUS FOR THE CONTROL OF INPUT DATA INTO A DATA PROCESSOR AND A DISPLAY DEVICE

[75] Inventor: Werner F. Arnold, Nuremberg, Fed. Rep. of Germany

[73] Assignee: Firma DIEHL, Nuremberg, Fed. Rep. of Germany

[21] Appl. No.: 877,763

[22] Filed: Feb. 14, 1978

[30] Foreign Application Priority Data

Feb. 19, 1977 [DE] Fed. Rep. of Germany ....... 2707208

[51] Int. Cl.² .......................... G06F 1/04; G06F 3/02; G06F 3/14
[52] U.S. Cl. .................................. 364/900; 340/711; 340/359; 179/90 AN; 235/92 DE
[58] Field of Search ........................... 179/90 AN, 5.5; 340/325, 337, 359, 361, 365 R, 365 S, 378.5, 711; 235/92 DE; 364/200 MS File, 900 MS File

[56] References Cited

U.S. PATENT DOCUMENTS

| | | | |
|---|---|---|---|
| 3,674,941 | 7/1972 | Guetta | 179/90 AN |
| 3,916,172 | 10/1975 | Engle, Jr. | 235/92 DE |
| 3,946,210 | 3/1976 | Fleischer | 235/92 DE |
| 3,967,690 | 7/1976 | Northcutt | 235/92 DE |
| 4,048,621 | 9/1977 | Conklin | 235/92 DE |
| 4,075,621 | 2/1978 | Salmon | 340/365 R |

*Primary Examiner*—James D. Thomas
*Attorney, Agent, or Firm*—Burns, Doane, Swecker & Mathis

[57] ABSTRACT

An input mechanism includes a plurality of input factor storage units for storing and coding pulses representative of input data. The stored data is transmitted to a data processor and to a decoder for subsequent display. Preferably, the number of storage units equals the number of display terminals on the display device. A selection device directs the pulses produced by a manually controllable pulse generator to one of the plurality of storage units.

19 Claims, 10 Drawing Figures

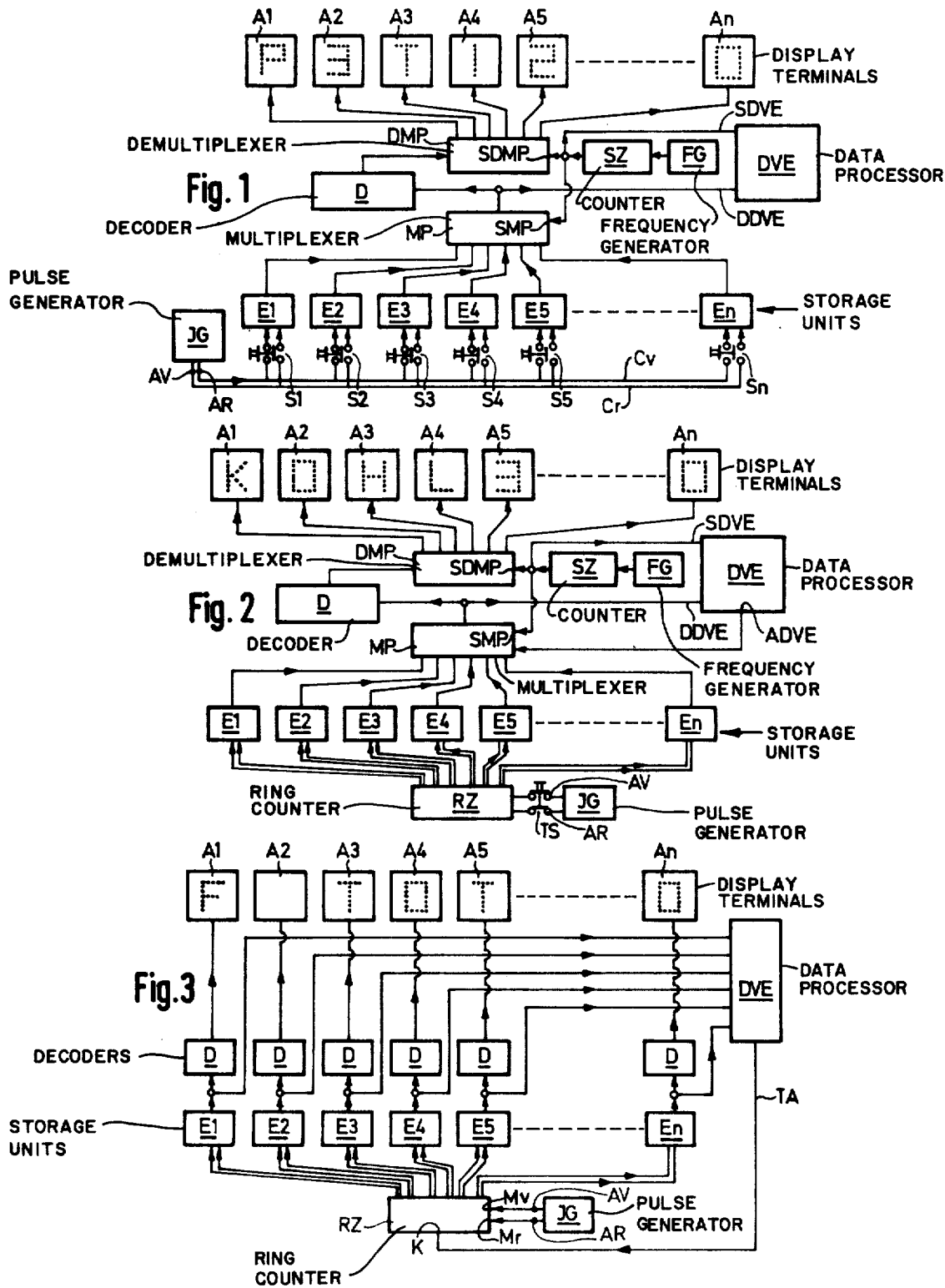

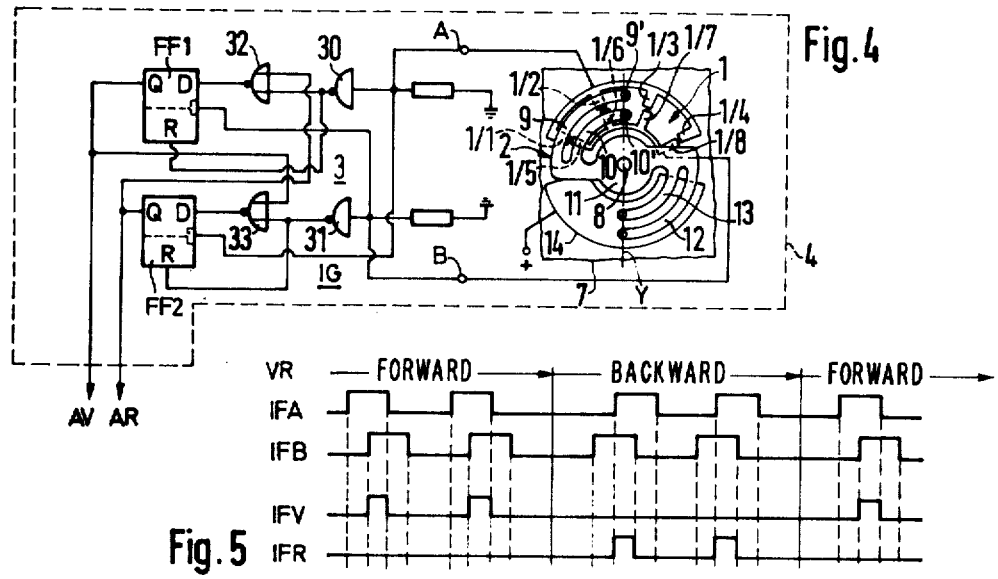
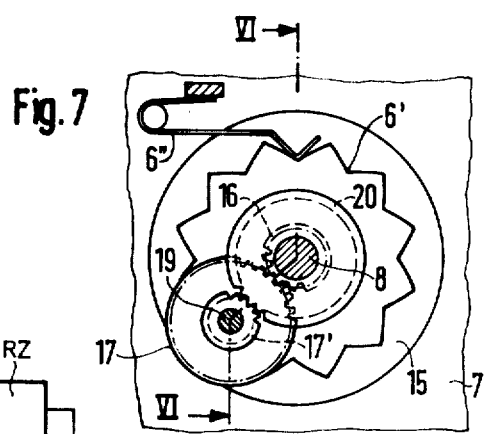
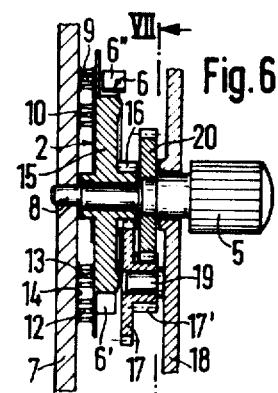
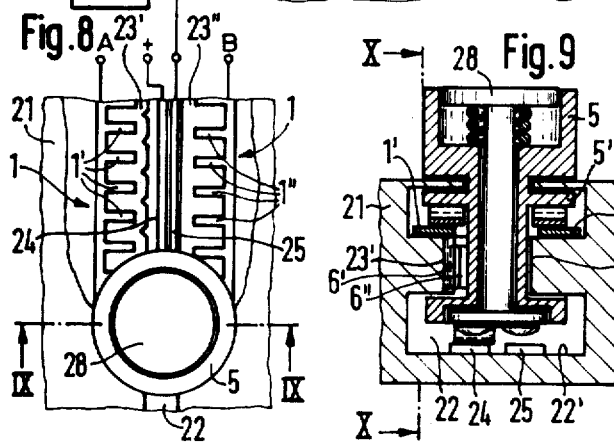
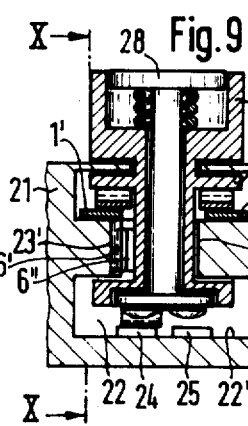
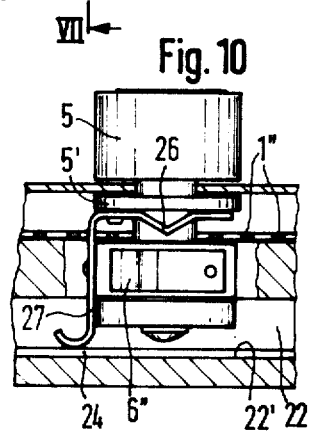

APPARATUS FOR THE CONTROL OF INPUT DATA INTO A DATA PROCESSOR AND A DISPLAY DEVICE

BACKGROUND OF THE INVENTION

The present invention relates to an input mechanism for generating electric pulses which can be converted into coded signals to be fed into an electronic data-processing system. The pulses can also be displayed in the form of alphanumeric characters by an electronic display device having a plurality of display terminals.

In known systems of this type, letters, numbers and other symbols are entered into an electronic data-processing system, and the input can be observed simultaneously by means of an electronic display device, for example, a typewriter keyboard as disclosed in published German application 1,499,170. However, such keyboards usually take up a relatively large amount of space and they are costly to manufacture.

OBJECT AND BRIEF SUMMARY OF THE INVENTION

It is therefore an object of the present invention to provide a mechanism for entering letters and symbols into a data-processing system as well as an electronic, alphanumeric display device which will replace a costly keyboard. The display device has a substantially smaller number of actuating elements and can be operated in an easy and simple manner.

The present invention accomplishes this and other objects by using several (n) input factor storage units, each being connected at its output terminal with the data-processing system and, by way of a decoding unit, with one of the n display terminals of the display device. The input terminals of the input factor storage units are connected with a selection device, and a pulse-generating device. Each pulse produced is coded in one of the input factor storage units designated by the selection device, for subsequent transmission to the data-processing system, and by way of a decoding unit, to an associated display terminal.

The input mechanism provided by the present invention can be employed in all instances where only a limited number of display places of a display device are available and a small number of letters, numerals and symbols will suffice for the full definition of certain input data. It is also useful where there is not sufficient space available for a keyboard having at least 36 character spaces.

The input mechanism provided by the present invention can be used for automated telephone information, for example. All of the components of the input mechanism including the electronic display device would be installed inside the telephone set or coupled to it by means of an auxiliary instrument. It is then possible, in order to obtain a telephone number, to enter the name and complete address of the person being called into an intermediate storage unit which is part of the data-processing system. The information would be shown simultaneously by the display device. After connection has been made with the proper number of the telephone system, the input data of the intermediate storage unit is entered into the central computer of the telephone company. After locating the person on the basis of the data furnished, the telephone company computer will then transmit the telephone number to the person make the query who can read the number from the display unit of his telephone set.

Instead of an automatic response to the query it is also feasible to make a direct telephone connection between the two persons involved by coupling the computer with the central telephone exchange. Private telephone books could be eliminated and there would be no need for personnel in the information sections of the telephone exchanges.

Another application of the input mechanism provided by the present invention, again for the purpose of automated information, would be a call for data from a central information section, for example by way of the display screen of a private television set. This data, shown on the screen either in stationary or in a continuously changing form, can deal with a great number of items, such as winning numbers in a lottery, state of the tide, weather reports, stock market listings, news, time tables and the like. A code word can be assigned to each specific type of information which is transmitted to the central information section and processed there in such manner that the operator can read the desired information on his television set which serves as monitor.

It is also possible to utilize the input mechanism provided by the present invention in order to set the course for, or to find certain coordinates of a matrix system which, acting as control device, is coupled to a device that will carry out certain commands. The coordinates for a specific point to be found or to be aimed at are fed into the matrix system by way of the input mechanism either by the use of certain code words or other data characterizing the desired point.

The input mechanism provided by the present invention can also be used for the programming of program control devices for electric home appliances, such as an electronic timer for cooking ranges. The input data, in the form of code combinations or words, can relate to the starting or the termination time of a cooking process, the type of the food being cooked, its weight, cooking time or temperature. This data is entered by means of the input mechanism in coded form into the timer of the cooking range and is made visible at the same time on the display unit in the form of alphanumeric characters. The only visible components are, according to one embodiment of the present invention, a control knob with key switch and electronic display device.

The input mechanism provided by the present invention is advantageous because of its versatile range of uses and because of its simple, space-saving construction when compared with prior art input mechanisms utilizing keyboards. Furthermore, it can be operated in a very simple manner due to the small number of actuating elements.

BRIEF DESCRIPTION OF THE DRAWINGS

FIG. 1 is a block wiring diagram of an embodiment of an input mechanism, with the flow of information being indicated by arrows;

FIG. 2 is a block wiring diagram of another embodiment of an input mechanism;

FIG. 3 is a block wiring diagram of a third embodiment of an input mechanism;

FIG. 4 is a schematic diagram of a pulse generator for use in an input mechanism;

FIG. 5 is a graph of pulses which can be generated by the pulse generator illustrated in FIG. 4;

FIG. 6 illustrates one embodiment of the mechanical portion of the pulse generator illustrated in FIG. 4 in cross-section along line VI—VI shown in FIG. 7;

FIG. 7 is a sectional view of the mechanism illustrated in FIG. 6 along the line VII—VII shown in FIG. 6;

FIG. 8 illustrates another embodiment of the mechanical portion of the pulse generator for use in an input mechanism;

FIG. 9 illustrates the mechanism of FIG. 8 in cross-section along the line IX—IX in FIG. 8; and FIG. 10 illustrates the mechanism of FIG. 9 in cross-section along the line X—X shown in FIG. 9.

DESCRIPTION OF THE DRAWINGS

An input mechanism, illustrated in FIGS. 1 to 3, consists of n input factor storage units E1, E2, E3 to En. Each storage unit is provided with a binary counter for coding the characters that are entered therein. Each input factor storage unit is connected at its output terminal with an electronic, data-processing system DVE and a decoding unit D. The decoding units D are connected to n display terminals A1, A2, A3 to An. The input terminal of each input factor storage unit is connected to a selection device. The selection device is connected with a pulse generator IG which generates electric pulses upon activation of a control means. Each of the generated pulses is entered into a particular input factor storage unit E1, E2, E3 to En selected by the selection device. The pulse is coded by the binary counter in the storage unit and transmitted to the data-processing system DVE as well as to an associated display terminal after passing through a decoding unit D.

Each of the input factor storage units E1, E2, E3 to En, has one six-bit binary counter. The output signal of each storage unit will comprise six output channels. On the basis of the six-bit code pattern it is possible, after entering the corresponding number of pulses produced by the pulse generator IG, to code in binary form at least all 26 characters of the alphabet as well as the numerals 0 to 9. If there is a need to enter a greater number of characters it is also possible to use a seven-bit counter in place of the six-bit counter in connection with the input factor storage unit.

Each six-bit binary counter of an input factor storage unit E1, E2, E3 to En is designed in the form of an UP-DOWN counter which has one forward and one backward input terminal. Both input terminals are connected by way of the selection device with the two output terminals of the pulse generator IG, forward counting output terminal AV and backward counting output terminal AR.

The selection device illustrated in FIG. 1 consists of a switching arrangement with n switches, S1, S2, S3 to Sn, arranged between the input factor storage units E1, E2, E3 to En, and the pulse generator IG. Each of the switches is connected by way of a terminal Cv, that is common to all the switches, with the forward counting output terminal AV of the pulse generator IG. A terminal Cr, likewise common to all the switches, connects them with the backward counting output terminal AR of the pulse generator IG. Furthermore, each of the switches is connected with the forward input terminal and the backward input terminal of its associated input factor storage unit, E1, E2, E3 to En.

The selection device illustrated in FIG. 2 consists of a switch TS which is connected in series between the output terminals AV and AR of the pulse generator IG and a ring counter RZ having several output terminals. Each output terminal of the ring counter RZ has one channel that is connected with the forward input terminal of the associated input factor storage unit and one channel connected with its backward input terminal. The output signals at the terminals of the ring counter RZ are switched by means of actuation of the switch TS, which is operated by means of a push button, so that pulses can then be entered into the input factor storage units connected to the ring counter RZ.

The selection device illustrated in FIG. 3, consists of a ring counter RZ having several output terminals. Each of the output terminals are connected with the two input terminals of an associated input factor storage unit by means of one channel for each input terminal. This ring counter RZ differs from the arrangement shown in FIG. 2 since it is connected by way of a first input line K with an output terminal TA of the data-processing system DVE. This input line K delivers step-advancing, i.e., clocking, signals. The ring counter RZ is connected by way of two other input terminals Mv, Mr with the output terminals AV and AR of the pulse generator IG. The signal at each of the output terminals of the ring counter RZ is switched to the next subsequent signal by one of the step-advancing signals on the line K. These step-advancing signals can be applied to the output terminal TA of the data processor DVE either manually by the actuation of a switch element or by a specifically programmed process, depending on the type of the data-processing system used.

If the switching of the ring counter output signals is controlled by a program, a feedback device (not illustrated) can be provided which would include a timing element arranged between the pulse generator IG and the ring counter RZ. The timing element generates an execution signal which is returned to the data-processing system DVE after a time delay of, for example, two seconds after the proper symbol has been entered into the input factor storage unit connected to the ring counter RZ at the particular moment. Thereafter, another switching signal is applied to the output terminal TA of the data-processing system to cause the ring counter to advance by one step to the next output terminal and thereby make connection with another input factor storge unit.

In place of a timing element, a switch, placed between ring counter RZ and pulse generator IG, can be used for the transmission of an execution signal to the data-processing system DVE after the information has been entered into the input factor storage unit, to eliminate a specific timing cycle and provide more flexibility in entering data.

The decoding unit D is formed by a ROM (read only memory) which converts the input code signal into an output control signal for activation of the proper display elements of an associated display terminal. The several display terminals A1, A2, A3, A4, A5 to An are preferably formed by an LED-diode matrix with 5×7 grid points. However, it will be obvious that a segmental display can also be used.

For the transmission of the coded signals from the input factor storage units E1, E2, E3 to En to the several display terminals A1, A2, A3 to An of the digital display, a single decoding unit and a multiplex system are used in the input mechanisms depicted in FIGS. 1 and 2. The multiplex system is utilized to provide a display of all signals coded in the input factor storage units at their respective places in the display device in such a manner that the display will appear static to the human eye. The multiplex system includes a multiplexer MP and a demultiplexer DMP. A digital counter SZ controls the system and is supplied at its input terminal with a clock frequency, for example 1 Khz produced by a frequency generator FG. The digital counter SZ consists of a ring counter with n counting positions, corresponding to the number n of the input factor storage units E1, E2 to En and the number of display terminals A1, A2 to An. The digital counter SZ is connected at its output terminal with the control input terminal SMP of the multiplexer MP and with the control input terminal SDMP of the demultiplexer DMP. The output terminal of the digital counter SZ is also connected with the control input SDVE of the data-processing system DVE. The multiplexer MP is connected at its input terminal to the output terminals of all the input factor storage units E1, E2, E3 to En. The output terminal of the multiplexer MP is connected to the decoding unit D and to the data input terminal DDVE of the data-processing system. The demultiplexer DMP is connected at its input terminal with the decoding unit D and at its output terminal with all display terminals A1, A2, A3 to An of the display device.

The embodiment of the input mechanism illustrated in FIG. 2 permits the feedback of an executed control command by displaying specific information at the display panel. A data output terminal ADVE of the data-processing system is connected with the multiplexer MP and a switching unit (not illustrated). The switching unit blocks the data input terminal DDVE of the data-processing system DVE and prevents the scanning of the input factor storage units E1, E2 to En by the multiplexer MP when an output signal is produced by the data processor.

In the embodiment of the input mechanism illustrated in FIG. 3, the output terminal of each input factor storage unit E1, E2, E3 to En is connected with one data input terminal DDVE of the data-processing system DVE and with one decoding unit D. The output terminal of each decoding unit D is connected with one of the display terminals A1, A2, A3 to An of the display device.

FIG. 4 illustrates, within the broken lines 4, one embodiment of a pulse generator IG which is suitable for use in the present invention. The pulse generator comprises a pulse stator 1, a pulse rotor 2, a control circuit 3, a manually movable actuating element 5 (FIGS. 6, 8, 9 and 10) and an arresting facility 6 (FIGS. 7 to 9). The pulse stator 1 of the pulse generator IG has two groups of four contact surfaces each, arranged on an insulative supporting plate 7. Each group is placed within a circle which is concentric relative to an axis of rotation of axle 8. The axle 8 is connected to the actuating element 5. The first group of contact surfaces 1/1, ½, ⅓, ¼ is arranged within an outer circle and the second group of contact surfaces 1/5, 1/6, 1/7, ⅛ within an inner circle. The contact surfaces of each group are conductively connected with each other and, by means of a common terminal A, or B respectively, with the control circuit 3. Each of the contact surfaces 1/1, ½, ⅓, ¼ of the first group is laterally offset by approximately one third of a contact surface width relative to the contact surface 1/5, 1/6, 1/7 or ⅛ of the second group which is radially adjacent to it.

The pulse rotor 2 has two spring contacts 9 and 10 which are molded in the form of bent leaf springs to an electrically conductive central member 11. The outer free ends 9' and 10' respectively of the two leaf springs 9 and 10 are located at a line Y which runs through the center of the axis of rotation and engage the two circular tracks of the contact surfaces of the pulse stator. The pulse rotor 2 has two other spring contacts 12 and 13, formed in the same manner as the two leaf springs 9 and 10. These contacts 12, 13 are molded to the central member 11 in such manner that they are staggered by 180° relative to the other leaf springs and symmetrically with respect to rotation of the rotor. The electrical connection between a voltage source (not illustrated) and the pulse rotor 2 is accomplished by a contact plate 14 shaped as the sector of an annulus. The contact plate 14 is placed on the insulative supporting plate 7 within the region of the two circular tracks and is connected to one terminal of the voltage source. When the pulse rotor 2 is turned, either pair of leaf springs 9, 10 or 12, 13 will alternately rest on the contact plate 14.

The pulse rotor 2 is punched from one piece of material and is fastened to a drive wheel 15 (FIG. 6) made of insulative material. The drive wheel 15 is freely rotatable about the axis of rotation of the axle 8. The drive wheel 15 carries a drive pinion 16 and notches 6'. The notches 6' are engaged by a stop spring 6" which is fastened to the supporting plate 7 to insure step-by-step rotation of the drive wheel 15. The drive pinion 16 of the drive wheel 15 is engaged by an intermediate gear wheel 17 which is rotatably mounted on a bolt 19 which is supported on a front plate 18. The intermediate gear wheel 17 forms one part of a step-up gear mechanism which includes a drive wheel 20. Drive wheel 20 is fixedly connected to the axle of rotation 8 and engages a gearing 17' of the intermediate wheel 17. The step-up gear mechanism is dimensioned so that during one full rotation of the actuating element 5, at least 36 pulses are generated.

Another embodiment of the mechanical portion of the pulse generator IG is illustrated in FIGS. 8 to 10. The contact surfaces of the pulse stator are not arranged within a circular path but along a straight-line guide track which is defined by a groove 22 machined into an insulative front plate 21. The profile of the groove 22 is depicted in FIG. 9. The contact surfaces of the pulse stator 1, denoted in FIG. 8 by symbols 1' and 1" respectively, are arranged in two groups at the upper sides of either one of the two opposed guide tracks 23' and 23". Each of the contact surfaces 1' is offset by approximately one third of a contact surface width relative to each of the contact surfaces 1", viewed in the longitudinal direction of the groove 22. The contact surfaces 1' and 1" respectively are connected as a group by way of a common connecting line with the terminal A or B.

At the bottom 22' of the groove 22 are a first current-conducting bar 24, connected to the voltage source, and a second current-conducting bar 25 connected to the ring counter RZ. Notches 6' of an arresting device 6 are molded into the side wall of the guide track 23'. A stop spring 6" engaging the notches is located on the side of the actuating element 5 which is designed in the form of a slide switch.

The slide switch 5 carries a collar 5', and a movable pulse producing element 2 is fastened to its bottom side. The pulse producing element 2 consists of two resilient reeds 26 which are arranged on the collar 5' in diametric opposition to each other. The reeds 26 coact with the contact surfaces 1' and 1" respectively of the pulse stator 1, and a resilient contact bridge 27 which slides along the current-conducting bar 24. The components of the pulse generator are designed so that one full movement of the slide switch 5 along the length of the guide track will produce at least 36 pulses, i.e., the number of pulses required to generate any of the characters capable of being displayed on the display device.

A key (FIG. 9) with a push button switch 28 is incorporated within the slide switch 5. This switch serves to connect the voltage source with the ring counter RZ, to advance the latter by way of the two current-conducting bars 24 and 25.

The control circuit 3 (FIG. 4) of the pulse generator IG consists of two bistable flip-flop circuits. A first flip-flop FF1 and a second flip-flop FF2 are each logically linked with the other by way of inverters 30 and 31 and NOR-gates 32 and 33. The flip-flops are responsive to the signals at the terminals A and B, and their output terminals respectively form the output terminals AV and AR of the pulse generator IG. The four logic gates serve to reset the two flip-flop units FF1 and FF2 and suppress bounce of the contacts of the pulse generator.

The electric pulses which can be produced are illustrated schematically in FIG. 5. VR denotes the direction of movement by the actuating element 5. IFA denotes the series of input pulses which are fed into the control circuit 3 by way of the terminal A, while IFB denotes the series of input pulses which reach the control circuit 3 by way of the terminal B. The individual input pulses shown in these two series of pulses are offset timewise relative to each other but overlap each other. The order of their generation is evaluated in the control logic. The pulses leaving the control logic 3 after completion of the evaluation are depicted by the pulse series IFV and IFR. The pulse series IFV portrays the pulses which leave the control circuit 3 of the pulse generator IG by means of output terminal AV and enter into the input storage unit by way of the forward input terminal. The pulse series IFR shows the pulses which leave the control circuit of the pulse generator IG by means of output terminal AR and enter into the input factor storage unit by way of the backward input terminal. The type of pulses in the pulse series IFV and IFR is the result of the configuration of the control circuit 3, especially of the logical linkage of the two flip-flop units FF1 and FF2. The pulse series IFV and IFR demonstrate that at any given time only one of the two circuit paths will be connected with the UP-DOWN counter of the specific input factor storage unit involved.

The signals fed into the input factor storage unit are coded therein by a six-bit binary counter. These coded signals are then transmitted directly to the data-processing system DVE and to the decoding units D in the embodiment of FIG. 3, as indicated by the arrows. The decoding unit D decodes the signals, and they are displayed in the form of alphanumeric or letter characters by the display elements of the display terminals.

For the embodiments depicted in FIGS. 1 and 2, the path of transmission of the characters to be entered into the input factor storage units E1, E2, E3 to En is somewhat more complex due to the single decoding unit. The frequency generator FG produces a clock frequency of, for example 1 Khz, to control the digital counter SZ. By means of this clock frequency, the signal in each of the individual n counter positions are advanced by a ring counter to the next counter position. The counting pulses so generated will in turn control the multiplexer MP, the demultiplexer DMP and the control input terminal of the data-processing system DVE. The multiplexer MP which is energized by the clock frequency will scan in series all input factor storage units E1, E2 to En as to their data content. Each character which has been entered into one of the input factor storage units E1, E2 to En and binary coded there by the binary counter will be transmitted in turn at the set clock frequency to the data-processing system DVE by way of data input terminal DDVE. At the same time, the signals are transmitted by way of the decoding unit D and the demultiplexer DMP to the correct display terminal A1, A2 to An.

In this manner, a code word is formed and entered into the data-processing system DVE. The code word consists of letters only or of a combination of letters and numerals which characterize a specific function or piece of information. The individual characters of each code word are stored in a buffer stage memory (not illustrated) until a complete code word is obtained. For example, when an information input has been completed, the information is forwarded to functional groups in the data processor for further processing by the actuation of an initiating key.

The further processing of the coded signals entered into the data-processing system DVE is accomplished independently of the input mechanism. However, the input mechanism of FIG. 2 includes a feed-back of an executed control command or of a programmed process by way of the multiplex system and the decoding facility to the display device. This feedback signal can appear at the several display terminals in the form of noncoded alphanumeric characters or in the form of a code word.

The present invention may be embodied in other specific forms without departing from the spirit or essential characteristics thereof. For example, the selection device illustrated in any one of FIGS. 1, 2 or 3 can be substituted for that shown in any of the other two figures. The presently disclosed embodiments are therefore considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. An input mechanism for use with a data processing system, comprising:

a plurality of input buffer storage units including coding means for translating stored pulses into alpha-numeric code signals, said input buffer storage units having output terminals connected to input terminals of the data processing system;

decoding means connected to output terminals of said storage units;

a display device having a plurality of digital display terminals respectively connected with one of said input buffer storage units by means of said decoding means;

means connected to input terminals of said input buffer storage units for selecting any one of the plurality of storage units; and pulse generating means including an electromechanical pulse generator with output terminals connected to input terminals of said selecting means, said pulse generating means being manually operable by an operating element for producing individual input pulses in response to movement of said operating element, each of said input pulses being applied to the one input buffer storage unit selected by said selecting means, and translated into one of said alpha-numeric code signals, the said code signal being applied to said data processing system and further via said decoding means to the associated display unit to be displayed as an alpha-numeric sign.

2. The input mechanism of claim 1, further including:
multiplexing means for controlling the transmission of signals from said plurality of input storage units to said decoding means, said multiplexing means having output terminals connected with the data processing system;
demultiplexing means for controlling the transmission of signals from said decoding means to said display device, said demultiplexing means having output terminals connected with the data processing system; and
a digital counting means for controlling the operation of said multiplexing means and said demultiplexing means, said digital counting means including a ring counter having a plurality of counting positions equal in number to the number of input storage units and being responsive to the output signal of a frequency generator, said digital counting means having output terminals connected with the data processor.

3. An input mechanism as defined in claim 1, wherein said decoding means includes a plurality of decoding units equal in number to the number of input storage units, each said decoding unit being connected with one input storage unit and one display terminal of said display device.

4. The input mechanism of claim 1, wherein said coding means includes a six-bit binary counter.

5. The input mechanism of claim 4, wherein said binary counter includes an UP-DOWN counter having two input terminals, and said pulse generating means includes first and second output terminals respectively connected with the two input terminals of said UP-DOWN counter.

6. The input mechanism of claim 5, wherein said means for selecting includes a switching system having a plurality of switches equal in number to the number of input storage units.

7. The input mechanism of claim 6, wherein each of said switches is connected by means of a first line common to all of the switches with said first output terminal of said pulse generating means and by means of a second line common to all of the switches with said second output terminal of said pulse generating means, and further wherein each of said switches is connected with the two input terminals of the UP-DOWN counter of an associated input storage unit.

8. The input mechanism of claim 1, wherein said means for selecting includes a switching system having a plurality of switches equal in number to the number of input storage units.

9. The input mechanism of claim 1, wherein said selecting means includes a switch connected to said pulse generating means and a ring counter having a plurality of output terminals, said ring counter being connected to said switch.

10. The input mechanism of claim 9, wherein said pulse generating means includes two output terminals and said ring counter has two input terminals for respective connection with the two output terminals of said pulse generating means by means of said switch, further wherein each of said plurality of input storage units has two input terminals and each of the output terminals of said ring counter has two channels for respective connection with the two input terminals of an associated input storage unit.

11. The input mechanism of claim 1, wherein said selecting means includes a ring counter having a plurality of input terminals and an input terminal connectable with an output terminal of a data processing system for producing clocking signals.

12. The input mechanism of claim 11, wherein said pulse generating means includes two output terminals and said ring counter has two additional input terminals for respective connection with the two output terminals of said pulse generating means, further wherein each of said plurality of input storage units has two input terminals and each of the output terminals of said ring counter has two channels for respective connection with the two input terminals of an associated input storage unit.

13. The input mechanism of claim 1, wherein said decoding means includes a read only memory.

14. The input mechanism of claim 1, wherein said pulse generating means includes a manually controlled actuating element for actuation of said electro-mechanical pulse generator and circuit means for controlling the pulses produced by said pulse generator.

15. The input mechanism of claim 1, wherein said electro-mechanical pulse generator includes two sets of electrical contacts which are movable relative to each other for generating pulses which are overlapping and staggered with respect to each other.

16. The input mechanism of claim 1, wherein said pulse generating means includes a rotatable, manually controlled, actuating element for actuation of said electro-mechanical pulse generator, a step-up gear mechanism for connecting said actuating element with said electro-mechanical pulse generator, and electrical contacts arranged concentric to the axis of rotation of said actuating element, said step-up gear mechanism providing a gear ratio which is sufficient to enable production of at least the number of pulses required to generate any of the characters capable of being displayed on said display device in one full rotation of said actuating element.

17. The input mechanism of claim 1, wherein said electro-mechanical pulse generator includes a guide track having electrical contacts therealong, and a manually controlled sliding switch movable along said guide track to produce pulses, whereby one movement of said sliding switch along the full length of said guide track is sufficient to enable production of at least the number of pulses required to generate any of the characters capable of being displayed on said display device.

18. The input mechanism of claim 1, wherein said electro-mechanical pulse generator produces at least two pulses having a phase difference between them, and said pulse generating means includes control circuit means for detecting the phase difference between said pulses and producing a control output pulse in response to the detected phase shift.

19. The input mechanism of claim 18, wherein said control circuit means includes two bistable flip-flop circuits which are logically interconnected by means of at least two logic gates.

* * * * *